Patented Oct. 24, 1944

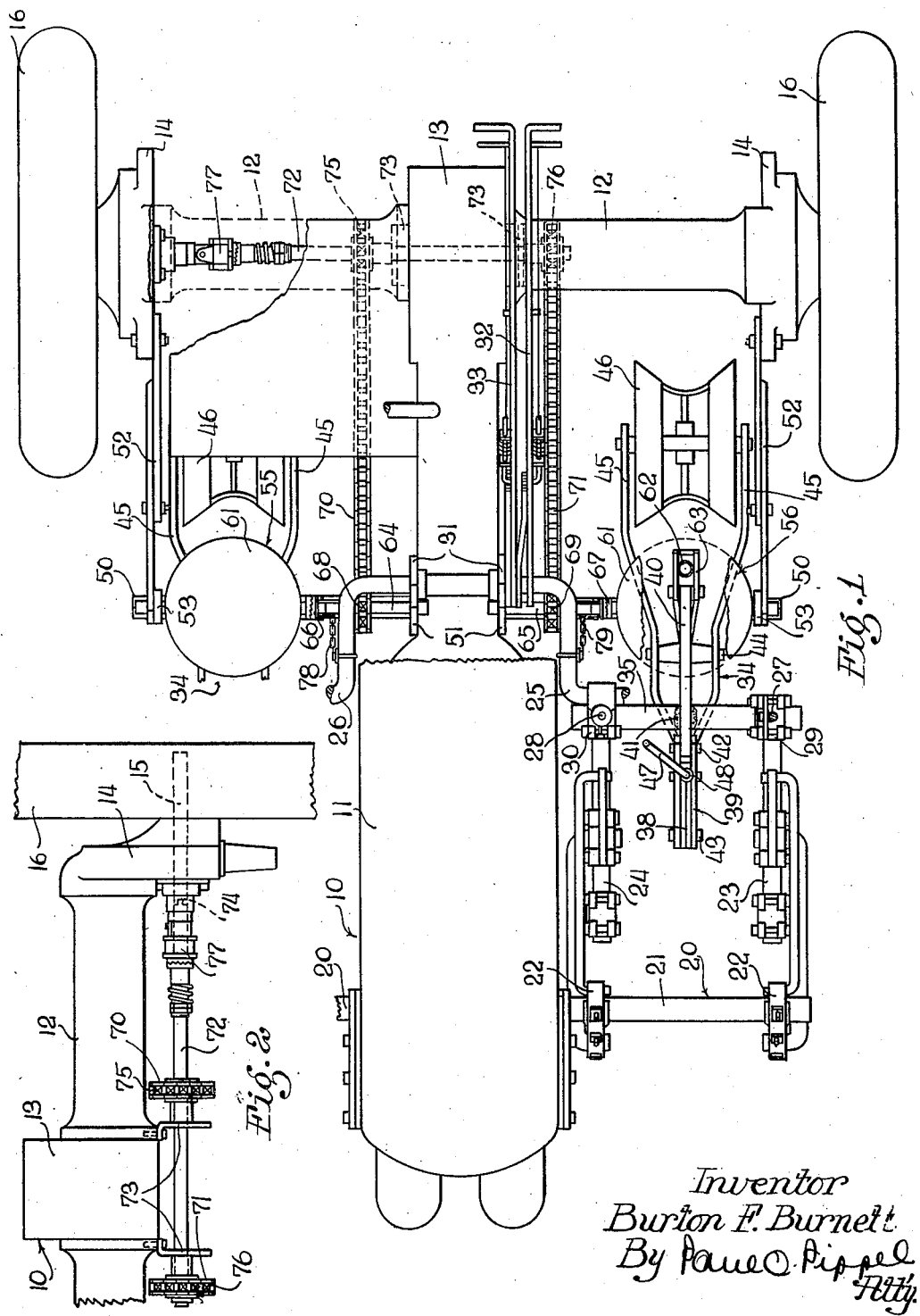

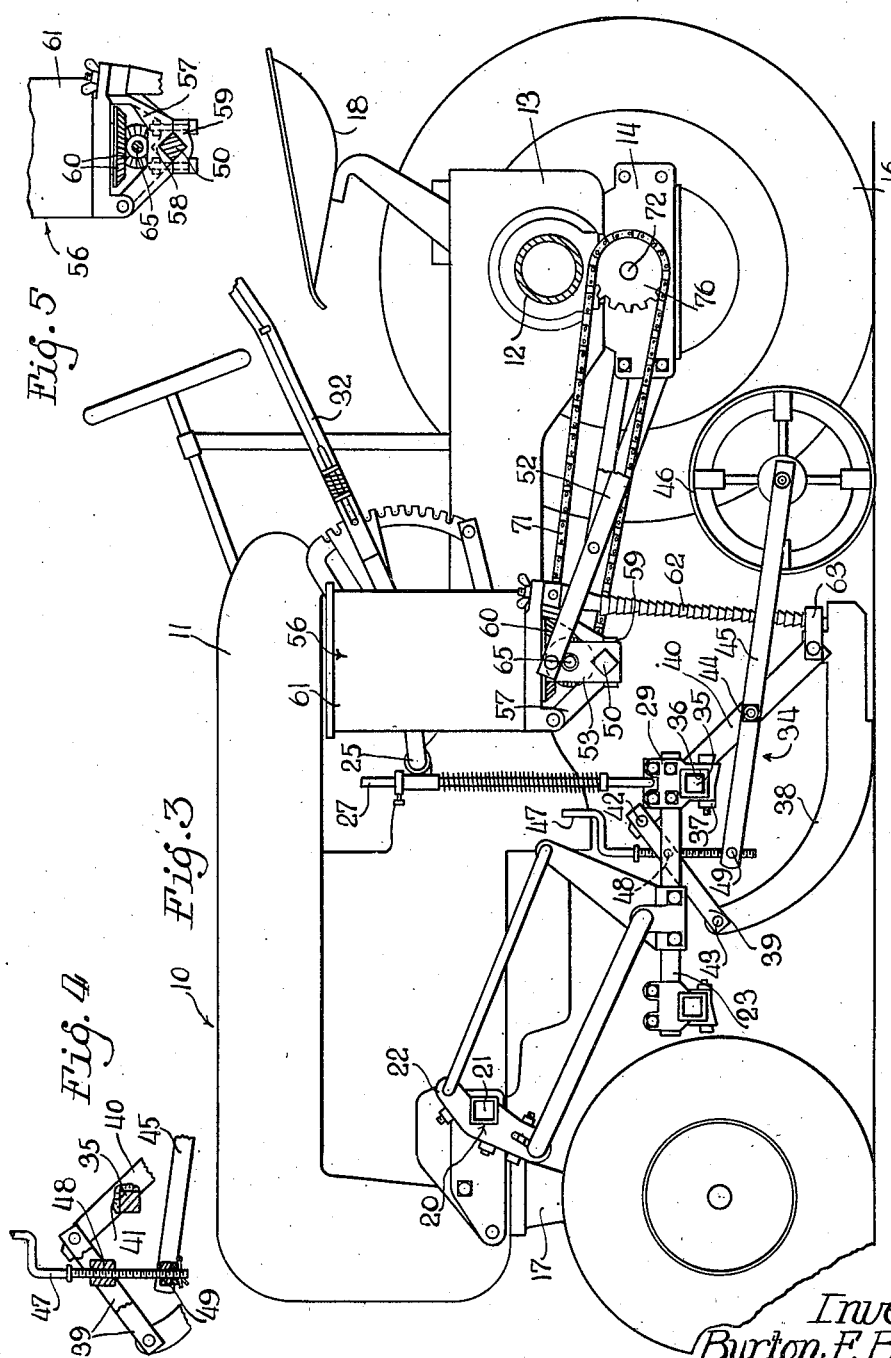

2,361,083

UNITED STATES PATENT OFFICE 2,361,083

DISPENSING ATTACHMENT FOR TRACTORS

Burton F. Burnett, Canton, Ill., assignor to International Harvester Company, a corporation of New Jersey Application June 6, 1941, Serial No. 396,894

3 Claims. (Cl. 97—47)

This invention relates to dispensing attachments for tractors.

It is an object of the invention to provide a self-contained furrowing unit adapted for attachment to cultivating rig supports carried on the tractor for vertical movement, and in its connection to the cultivating rig supports, means for rendering the same laterally adjustable with respect to the supports.

It is another object of the invention to provide in a dispensing attachment for tractors, means for controlling individually the dispensing units on opposite sides of the tractor independently with respect to each other, so that the dispensing of materials, such as seeds or fertilizer, may be stopped automatically on one side of the tractor prior to stopping of the same on the other side of the tractor and to thereby make the dispensing attachment adaptable for operation on pointed rows or upon terraced land where there are times that only one side of the attachment is used.

It is another object of the invention to provide in a power take-off shaft, connected with the transverse axle structure and adapted to receive power from a stub axle associated therewith, a slip clutch mechanism.

According to the present invention, the self-contained furrowing unit, serving as a part of the dispensing attachment, includes a transversely extending attaching portion adapted to extend between a pair of cultivating rigs located at the side of the tractor. Brackets are provided on each of these rigs and the attaching portion is fixed within openings provided in the brackets. Once the attachment of the unit is made fast, both of the rigs will become connected and will operate in unison. The unit itself includes a furrow opener of the runner type and bracing elements connecting the opener with the transverse attaching portion. Carried by the bracing elements is a gauge and covering wheel, and means is provided for adjusting this wheel with respect to the runner.

On each side of the tractor is located a dispensing unit and its associated drive shaft means. In each drive shaft is provided a clutch which is adapted to be operated by the lifting mechanism serving to lift the corresponding runner units to a transport position. Either one of the runner attachments, located on opposite sides of the tractor, may be respectively raised to a transport position independently of the other and upon doing so the corresponding dispensing unit will have its drive shaft means declutched from the main drive mechanism. The main drive mechanism is carried by the transverse axle structure and arranged to receive power from the stub axle associated therewith. In the main drive mechanism or shaft there is provided the automatic slip clutch, the same thereby being located on the transverse axle structure and common to both of the dispensing units. The main drive shaft extends sufficiently beyond the central portion of the tractor to permit the chain drive for the dispensing unit at that side of the tractor to be located close to the longitudinal body portion. The chain drive for the dispensing unit, located on the same side of the tractor that the main drive shaft is connected to the stub axle, is also located to be close to the longitudinal body portion of the tractor.

For other objects and for a better understanding of the invention, reference may be had to the following detailed description taken in conjunction with the accompanying sheets of drawings, in which:

Figure 1 is a plan view of the tractor and of the dispensing attachment embodying the features of the present invention attached thereto;

Figure 2 is a rear view of a portion of the tractor and of the main drive mechanism having the slip clutch and connected to the stub axle;

Figure 3 is a view in elevation of the tractor with one of the drive wheels removed and of the dispensing attachment;

Figure 4 is a fragmentary view of a portion of the self-contained furrowing unit; and, Figure 5 is a fragmentary view in elevation of the dispensing unit and illustrating its attachment to the transversely extending support on the tractor.

Referring now to the drawings, there is shown a tractor or tool supporting structure 10 having a longitudinally extending body portion 11 and a transverse axle structure 12 having a central portion 13 coextensive with the longitudinal body portion 11. The transverse axle structure includes stub axle housings 14 having a stub axle 15 therein to which is connected a drive wheel 16. The forward part of the tractor is supported on a steerable bolster structure 17 operable from an operator's station 18 located on the rear axle structure 12.

There is contained on the forward portion of the longitudinal body portion at each side thereof, a transversely extending bracket structure 20. This bracket structure includes a square sectioned pipe 21 adapted for the attachment thereto of cultivating rig attaching brackets 22.

There is usually connected to each side of the tractor a pair of such brackets for respectively connecting with the tractor a pair of cultivating rig supports 23 and 24. These rig supports are laterally spaced with respect to each other and normally, when they are used for the purpose of cultivating row crops, have independent vertical movement with respect to each other. There is located on each side of the tractor a pair of such rigs and separate individual lifting means is provided for each pair of rigs.

This lifting means includes a pair of vertically movable laterally extending crank arms 25 and 26. The crank arm 25 extends laterally for connection to the rigs 23 and 24 at the left-hand side of the tractor by means of rods 27 and 28 connected respectively to brackets 29 and 30 carried respectively by the rig supports 23 and 24. The lifting cranks 25 and 26 are pivotally connected to the midship portion of the tractor by attaching plates 31. For operating these cranks there is provided a pair of manual operating levers 32 and 33 extending rearwardly and accessible to the operator's station 18. While only a fragmentary showing is made of the rig construction located at the left-hand side of the tractor, it should be understood that it is the duplicate of the construction shown at the right-hand side of the tractor. By operating the lever 33, the rigs at the right-hand side of the tractor are raised, and by operating the lever 32, the rigs at the left-hand side of the tractor are raised.

Connected between the rig supports 23 and 24 by means of the brackets 29 and 30 is a self-contained furrowing unit indicated generally at 34. This unit includes a transversely extending attaching portion 35 adapted to be inserted within squared openings 36 of the brackets 29 and 30. This attaching portion 35 is of square cross-section and when once inserted within the square openings of the brackets 29 and 30, is there retained against vertical angular movement. Each of the brackets is provided with a clamping means 37 which retains the attaching portion against lateral movement. When these clamping means are loose, the unit may be adjusted laterally with respect to the rig supports 23, and in this way the furrowing unit can be adapted for different row spacings and upon the clamping means 37 being tightened can thereby be tightened in its laterally adjusted position.

The furrowing unit 34 further includes a runner element 38 connected to the transversely extending attaching portion 35 by means of the bracing members 39 and 40. The bracing member 40 is connected to the rearward end of the runner 38 and extends forwardly for connection to the transverse attaching portion 35 as by welding indicated at 41. The bracing means 39 includes a pair of straps connected to the forward end of the bracing member 40, as indicated at 42, and to the forward end of the runner 38, as indicated at 43. Pivoted on the bracing member 40, as indicated at 44 in laterally spaced relation, is a pair of longitudinally extending strap members 45. These strap members, at their rearward ends, are provided for the connection thereto of a gauge and covering wheel 46 located immediately in rear of the runner element 38. The straps 45 extend forwardly beyond their pivotal connection 34 for attachment to a manual adjusting means 47 of the hand screw type carried by the bracing means 39 by a trunnion element 48 and connected to the straps 45 by a trunnion element 49. By operating the hand screw 47, the gauge and covering wheel 46 may be vertically adjusted with respect to the runner element 38 to thereby vary the furrowing depth of the runner. It should now be apparent that there has been provided a self-contained furrowing unit having in itself means for adjusting the gauge and covering wheel with respect to the runner element and attachable to laterally spaced cultivating rig supports.

Extending transversely under the tractor to locations laterally removed from opposite sides thereof is a transverse supporting member 50. This transverse supporting member is connected to the body of the tractor, as indicated at 51, and is braced at its outer ends by forwardly extending bracing means 52, respectively connected to the stub axle housings 14. This bracing means is connected to a vertically extending plate element 53 located and secured on the end of the transversely extending supporting member 50. The transverse supporting member 50 is of square cross-section and is arranged to have its sides angled with respect to the horizontal. On the right-hand side of the tractor is mounted on this transverse member a dispensing unit 55, while on the left-hand side of the tractor is mounted on the same a dispensing unit 56.

Referring to Figure 5, it will be noted that the dispensing unit includes a bracket structure 57 having a portion 58 adapted for attachment to the top of the square supporting member and a clamping means 59 for rigidly securing the same in its laterally adjusted position along the squared bar. Each dispensing unit has parts 60 adapted to be driven, and upon operation of the same, seed or the like material, carried by hopper portions 61, is dispensed through a funnel 62 connected with the rear end of the runner 38, as indicated at 63. For each of the dispensing units 55 and 56, there is provided a drive shaft means 64 and 65, each of which has coupled therein, respectively, a disconnecting clutch means 66 and 67. The shaft means 64 has thereon a chain sprocket 68, while the drive means 65 has thereon a chain sprocket 69. These chain sprockets 68 and 69 have connected thereto, respectively, chain drives 70 and 71 running rearwardly on opposite sides of the tractor and close to the longitudinally extending body portion 11 to a location immediately beneath the transverse axle structure 12 for connection with the main drive mechanism 72, shown more clearly in Figures 1 and 2.

This main drive mechanism is supported from the central portion 13 of the axle structure by means of brackets 73 and extends coextensively with the axle structure for connection with the stub axle 15, as indicated at 74. On this main drive shaft means 72, there is carried respectively drive sprockets 75 and 76 through which connection is made with the chain drives 70 and 71. The main drive mechanism 72 includes a slip clutch means 77 immediately removed from the connection of the drive shaft with the stub axle 15. It should now be apparent that there has been provided a simple drive mechanism adapted to receive power from the stub axle and at the same time to provide for separate control of the dispensing units located respectively at the opposite sides of the tractor.

The clutch means 66 is connected to the lifting crank arm 26 by means of a chain 78 arranged to automatically declutch the disconnecting means 66 upon the lifting of the rig and furrowing unit located at the right side of the tractor. The clutch 67 in the drive means for the dispensing unit 56 located at the left side of the tractor is likewise operated by a chain 79 connected with the lifting crank arm 25. It is highly desirable upon planting or dispensing of material along pointed rows to have the operation of one unit made independent of the operation of the other unit. This is accomplished by providing separately controlled driving mechanism for each of the dispensing units located respectively on opposite sides of the tractor and common drive means for the driving of these individual drive means. By locating the slip clutch 77 in the common drive means, the same is effective when either one of the dispensing units is operating alone.

While various changes may be made in the detail construction, it shall be understood that such changes will be made within the spirit and scope of the present invention as defined by the appended claims.

What is claimed is:

1. In combination, a main supporting structure, support means connected to the main supporting structure for vertical movement, a self-contained furrowing unit adapted for attachment to the support means to be vertically movable therewith and including a longitudinally extending furrowing element, bracing means including elements connected together and connected respectively to the furrowing element, a transverse attaching portion of square shape, one of the bracing elements having a notch adapted to receive a part of the square shaped attaching portion to be weldingly secured thereto.

2. In combination, a main supporting structure, support means connected to the supporting structure for vertical movement, a working tool unit adapted for attachment to the support means to be vertically movable therewith and including a longitudinally extending working element, vertically extending bracing elements connected together and connected respectively to the working element at spaced longitudinal locations therealong, and a transverse attaching portion secured to one of the bracing elements and serving for the attachment of the unit to the support means.

3. In combination, a main supporting structure, support means connected to the supporting structure for vertical movement, a self-contained working tool unit adapted for attachment to the support means to be vertically movable therewith and including a longitudinally extending working element, bracing means including vertically extending bracing elements connected together and connected respectively to the working element at longitudinally spaced locations thereon, a gauge wheel, means for connecting the gauge wheel to one of the bracing elements for vertical adjustment with respect thereto, and manually adjustable means carried by the bracing means and connected to the gauge wheel connecting means for effecting adjustment of the same and its gauge wheel.

BURTON F. BURNETT.